3,317,291
NONCLOGGING FUEL OIL COMPOSITIONS
Byron E. Marsh, Mount Vernon, and Donald Joseph Tucek, Berwyn, Ill., assignors to Armour and Company, Chicago, Ill., a corporation of Delaware
No Drawing. Filed July 16, 1963, Ser. No. 295,525
12 Claims. (Cl. 44—72)

This application is a continuation-in-part of our copending application Ser. No. 26,426 filed May 3, 1960, now abandoned.

This invention relates to fuel oil compositions, and more particularly to synergistic fuel oil compositions having improved sludge dispersing properties.

It is well known that hydrocarbon fuel oils, such as those used in burner systems, tanks, diesel and combustion engines and other industrial and domestic equipment, are subject to numerous shortcomings due to chemical deterioration and impurities, either introduced or not removed in processing. This is particularly true of fuel oils which contain a substantial quantity of cracked components. Many oils tend to develop undesirable solids or sludge which deleteriously affect the usefulness of the oils, either by diminution of their combustive capacity or by their tendency to clog the filters present in the equipment being employed. The petroleum industry has attacked the problem of improving fuel oil compositions from several aspects. One is improved processing techniques; another is blending of oils; still a third, which is somewhat akin to the second, is the addition of chemical agents. This invention relates to the latter method of improving fuel oil compositions.

In accordance with the present invention, we combine two groups of chemical compounds which when used together produce a markedly increased sludge inhibitory effect greater than the inhibition effect of either compound when used alone.

It is, therefore, an object of this invention to provide improved fuel oil compositions for inhibiting sludge formation in hydrocarbon fuel oils. It is another object to provide distillate fuel oil compositions having excellent performance characteristics with respect to freedom from screen clogging, even after extensive storage under oxidizing conditions and in the presence of water. A still further object of this invention is to provide a particular type of distillate fuel oil composition or a blend thereof which is non-corrosive, stable, and effective for inhibiting and dispersing sludge and other fuel oil contaminants.

One class of chemical compounds which can be used as additives, particularly as dispersants, in accordance with the present invention are selected from the group consisting of n-alkyl, -alkylaryl, -substituted alkyl, -substituted alkylaryl ammonium salts, N,N'-alkyl, -alkylaryl, -substituted alkyl, -substituted alkylaryl, alkyl substituted heterocyclic di-ammonium salts, and salts of cyanoethylated amines. The compounds of this group may be represented by the respective formulae

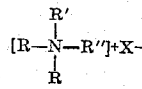

and

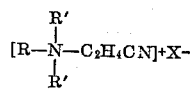

wherein R is an aliphatic hydrocarbon radical having from 8 to 22 carbon atoms, R' is selected from the group consisting of hydrogen, cyanoethyl, lower alkyl radicals having from 1 to 5 carbon atoms, and alkylaryl, R" is selected from the group consisting of lower alkyl radicals having from 1 to 5 carbon atoms, alkylaryl and aryl radicals, cyanoethyl radicals and radicals represented by the formula

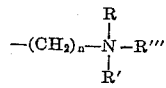

wherein R and R' are as defined above, R''' is selected from the group consisting of aliphatic hydrocarbon radicals having from 1 to 22 carbon atoms, alkylaryl radicals, aryl radicals, n is an integer of from 1 to 10, and X is an anion such as nitrite, halogen, sulfate, alkyl sulfate, oleate, palmitate, stearate, benzoate, organic and inorganic phosphate, etc.

Examples of radicals coming within the definition of R include octyl, nonyl, decyl, undecyl, dodecyl, tridecyl, tetradecyl, pentadecyl, hexadecyl, heptadecyl, octadecyl, eicosyl, docosyl, octadecenyl, octadecadienyl, octadecatrienyl, dodecenyl, and mixtures of hydrocarbon radicals as derived from tall oil, tallow, soybean oil, coconut oil, cottonseed oil, and other animal and vegetable oils. Examples of radicals coming within the definition of R' include methyl, ethyl, propyl, isopropyl, butyl, propargyl, dodecylbenzyl, and isobutyl. The anion in the above formulae, although having no apparent effect on the dispersant properties of the additive, greatly influences the solubility of the additive. Depending upon the degree of solubility desired, therefore, the choice of anion is quite broad.

Our preferred compounds are disoya dimethyl ammonium chloride, dihydrogenated tallow dimethyl ammonium chloride, N-tallow cyanoethyl amine oleate, N-tallow cyanoethyl amine palmitate, di-tallow mono-cyanoethyl-mono-methyl ammonium sulfate, and dimethyl dihydrogenated tallow quaternary ammonium nitrite.

The above-described additives when combined with a group of fatty nitrogen derivatives consisting of aliphatic secondary amines, aliphatic tertiary amines, dialiphatic-beta-aminopropion-aldehydes, aliphatic secondary amine-formaldehyde reaction products, diamines, and combinations thereof, form in fuel oil a synergistic combination substantially increasing the dispersion of sludge.

The quantity of these oil-soluble, non-ash forming chemicals which can be added to the fuel oil in accordance with the present invention can vary within wide limits, depending upon the nature of the oil, especially those containing a substantial quantity of cracked components, and the use to which it is to be put. While the concentration of the added chemicals can be as low as about 10 parts per million in the case of the dispersants and 25 parts per million in the case of the inhibitors, and as high for each as 1 or 2 weight percent, we prefer, in the case of domestic fuel oils which are blends of cracked hydrocarbon fuels and straight fuels to add between 50 and about 100 parts per million of the combined chemical additives. The amount of the sludge inhibitor component may be less than, equal to, or greater than the amount of the dispersing additive employed. Usually, we find the best results when the quaternary compound or di-quaternary compound is used in the proportion of about 25 to 50 parts per million, and the secondary and tertiary amines, etc., are used in the proportion of about 50 to 100 parts per million, the proportion of amines being about twice or three times the amount of the quarternary ammonium compound. In other words, we prefer to employ in the fuel oil composition the quaternary ammonium salt in the proportion of about 0.0010 to about 2.0 weight percent, and the amine compound in the proportion of about 0.0025 to about 2.0 weight percent. Chemical additives are, in general, liquids and oil-soluble, and can be dissolved to provide the desired concentration of additive in the resulting fuel oil.

The hydrocarbon distillate fuel oils in which the active chemical ingredients of this invention are dispersed or dissolved can be treated or untreated cracked fuel oils or mixtures of cracked fuels with straight run fuel oils, said fuel oils having components normally distilling from about 300° F. to about 700° F. Preferred fuels have a boiling range of from about 340° F. to about 700° F. and particularly from about 400° F. to about 675° F. Specifically, hydrocarbon distillates which utilize bases in the compositions of this invention are cracked gas oils, fuel oils, furnace oils, burner oils, diesel fuel oils, kerosene, etc., and mixtures of said cracked fuels with the corresponding or like straight run hydrocarbon fractions.

The following example may be set out to illustrate the synergism accomplished by combining the quaternary ammonium compound with the amines, etc., described above.

EXAMPLE I

The test used to evaluate the dispersability of the chemicals and the formation of sludge, etc., was Socony Mobil Method 530–57. In this test, fuel oil containing a weighed amount of sludge is circulated by means of a fuel oil burner pump through a 100 mesh Monel strainer. The amount of sludge retained by the strainer is collected in a tared Gooch crucible and weighed.

Fifteen grams of a synthetic sludge are added to one gallon of mineral spirits along with a known concentration of additive and the mixture circulated through the system for two hours. The deposit of sludge using an additive is compared to that of a control. The results are recorded as percent reduction in screen deposit.

The synthetic sludge (a mixture of water, kerosene and lampblack) used, correlates well with tests run with actual sludge and has the advantage of uniformity. It is prepared by homogenizing to a mayonnaise consistency, 50% (by weight) of water, 40% of kerosene, and 10% of Eagle Brand Germantown Lampblack. Mineral spirits was substituted for fuel oil because of its higher degree of purity.

The tests were made with respect to a control in which there was no additive and with respect to a quaternary ammonium compound (Arquad 2HT-T) and to an amine, diamine, etc. compound. Combinations of the quaternary ammonium compound and the amine compounds were then made as set out in the following table. In the table which sets out the products in terms of their commercial designations, the following is a full description of such commercial designations:

Arquad 2HT-T—Dimethyl, dihydrogenated tallow quaternary ammonium chloride (textile grade).
Arquad 2S—Dimethyl, disoya quaternary ammonium chloride.
Armolad F–20—(Armeen 2C) Dicocoamine.
Armolad F–22—Alpha dimethyl beta - dicocoaminopropionaldehyde.
Armolad F–24—Armeen 2T-methylol—a reaction product of di-tallowamine and formaldehyde.
Armolad 26—(Armeen DMS) Dimethylsoyaamine.
Armolad 28—(Duomeen C) N-cocotrimethylene diamine.
Arquad 2HT-Nitrite—Dimethyl, dihydrogenated tallow quaternary ammonium nitrite.
Duomeen T—N-tallow trimethylene diamine.

TABLE I

| Additive | Concentration of Additive in Parts per Million | Weight of Deposit in Milligrams |
| --- | --- | --- |
| None (control) | 0 | 789.0 |
| Arquad 2HT-T | 25 | 80.0 |
| Armolad F-20 | 100 | (¹) |
| Armolad F-22 | 100 | (¹) |
| Armolad F-24 | 100 | (¹) |
| Armolad F-26 | 100 | (¹) |
| Armolad F-28 | 100 | (¹) |
| Arquad 2HT-T / Armolad F-26 | 25 / 75 | 58.6 |
| Arquad 2HT-T / Armolad F-28 | 25 / 75 | 72.3 |
| Arquad 2HT-T / Armolad F-22 | 25 / 75 | 57.9 |
| Arquad 2HT-T / Armolad F-20 | 25 / 75 | 26.3 |
| Arquad 2HT-T / Armolad F-24 | 25 / 75 | 74.7 |
| Arquad 2S / Armolad F-22 | 25 / 50 | 41.0 |
| Arquad 2HT-Nitrite / Duomeen T | 25 / 75 | 26.0 |

¹ Heavy deposit (about 789.0).

As indicated in the above table, the quaternary ammonium compound when used alone gives some sludge dispersion, while the Armolad (amine) additives exhibited no sludge dispersion. By combining the quaternary with the amine additive, there was a markedly increased sludge dispersing effect.

While this invention has been described and exemplified in terms of its preferred embodiments, those skilled in the art will appreciate that variations can be made without departing from the spirit and scope of the invention.

We claim:
1. A fuel oil composition comprising fuel oil and an additive from about 0.0010 to about 2.0 weight percent of a quaternary ammonium salt having the formula

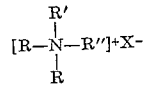

wherein R is an aliphatic hydrocarbon radical having from 8 to 22 carbon atoms, R' is selected from the group consisting of alkyl radicals having from 1 to 5 carbon atoms and alkyaryl, R″ is selected from the group consisting of alkyl radicals having from 1 to 5 carbon atoms, alkylaryl, aryl, and cyanoethyl, and X is an anion, and about 0.0025 to about 2.0 weight percent of a compound selected from the group consisting of aliphatic secondary and tertiary amines, dialiphatic - beta - amino - propionaldehydes, N-methyloldialkylamines, and N-alkyl diamines; said additive having a synergistic sludge dispersing action.

2. The fuel oil composition of claim 1 in which said quaternary ammonium salt is a nitrite salt.

3. A fuel oil composition comprising fuel oil and an additive from about 0.0010 to about 2.0 weight percent of dimethyl, dihydrogenated tallow quaternary ammonium salt and about 0.0025 to about 2.0 weight percent of a compound selected from the group consisting of aliphatic secondary and tertiary amines, dialiphatic-beta-amino-propionaldehydes, N-methyloldialkylamines, and N-alkyl diamines; said additive having a synergistic sludge dispersing action.

4. A fuel oil composition comprising fuel oil and an additive from about 0.0010 to about 2.0 weight percent of dimethyl, disoya quaternary ammonium chloride and about 0.0025 to about 2.0 weight percent of a compound selected from the group consisting of aliphatic secondary and tertiary amines, dialiphatic-beta-amino-propionaldehydes, N-methyloldialkylamines, and N-alkyl diamines; said additive having a synergistic sludge dispersing action.

5. A fuel oil composition comprising fuel oil and about 25 parts per million of dimethyl, dihydrogenated tallow quaternary ammonium chloride and about 75 parts per million of dimethylsoyaamine.

6. A fuel oil composition comprising fuel oil and about 25 parts per million of dimethyl, dihydrogenated tallow quaternary ammonium chloride and about 75 parts per million of N-cocotrimethylene diamine.

7. A fuel oil composition comprising fuel oil and about 25 parts per million of dimethyl, dihydrogenated tallow quaternary ammonium chloride and about 75 parts per million of alpha dimethyl beta-dicocoaminopropionaldehyde.

8. A fuel oil composition comprising fuel oil and about 25 parts per million of dimethyl, dihydrogenated tallow quaternary ammonium chloride and about 75 parts of dicocoamine.

9. A fuel oil composition comprising fuel oil and about 25 parts per million of dimethyl, dihydrogenated tallow quaternary ammonium chloride and about 75 parts per million of a reaction product of ditallowamine and formaldehyde.

10. A fuel oil composition comprising fuel oil and an additive about 25 parts per million of dimethyl, dihydrogenated tallow quaternary ammonium nitrite and about 75 parts per million of N-tallow trimethylene diamine.

11. A fuel oil composition comprising fuel oil and an additive about 25 parts per million of dimethyl, disoya quaternary ammonium chloride and about 50 parts per million of alpha dimethyl beta-dicocoaminopropionaldehyde.

12. A fuel oil composition comprising fuel oil and about 25 to 50 parts per million of a quaternary ammonium salt selected from the group consisting of dimethyl, dihydrogenated tallow quaternary ammonium chloride and dimethyl, disoya quaternary ammonium chloride and about 50 to 100 parts per million of a compound selected from the group consisting of dicocoamine, alpha dimethyl beta - dicocoaminopropionaldehyde, N - methylolditallowamine, dimethylsoyaamine, and N-cocotrimethylene diamine; said composition having a synergistic sludge dispersing action.

References Cited by the Examiner
UNITED STATES PATENTS

| | | | |
|---|---|---|---|
| 2,321,517 | 6/1943 | Rosen | 252—51 |
| 2,563,506 | 8/1951 | Werntz | 44—72 |
| 2,570,377 | 10/1951 | Revukas | 44—72 |
| 2,684,292 | 7/1954 | Caron et al. | 44—72 |
| 2,701,187 | 2/1955 | Andress | 44—73 |
| 2,758,086 | 8/1956 | Stuart et al. | |
| 2,798,798 | 7/1957 | Marsh et al. | 44—73 |
| 2,904,416 | 9/1959 | Clarke et al. | 44—72 |
| 3,008,813 | 11/1961 | Siegel | 44—72 |

DANIEL E. WYMAN, *Primary Examiner.*

Y. M. HARRIS, *Assistant Examiner.*